US007081896B1

(12) United States Patent
Rao et al.

(10) Patent No.: US 7,081,896 B1
(45) Date of Patent: Jul. 25, 2006

(54) MEMORY REQUEST TIMING RANDOMIZER

(75) Inventors: Krishnaraj S. Rao, Sunnyvale, CA (US); David G. Reed, Saratoga, CA (US); Jeff Irwin, Sunnyvale, CA (US)

(73) Assignee: NVIDIA Corporation, Santa Clara, CA (US)

( * ) Notice: Subject to any disclaimer, the term of this patent is extended or adjusted under 35 U.S.C. 154(b) by 259 days.

(21) Appl. No.: 10/234,629

(22) Filed: Sep. 3, 2002

Related U.S. Application Data

(60) Provisional application No. 60/406,514, filed on Aug. 27, 2002.

(51) Int. Cl.
*G06F 13/372* (2006.01)
*G09G 5/36* (2006.01)

(52) U.S. Cl. .................................... 345/534; 345/558

(58) Field of Classification Search ............... 345/534, 345/503, 519–520, 558; 711/167–169
See application file for complete search history.

(56) References Cited

U.S. PATENT DOCUMENTS 4,896,212 A * 1/1990 Chantelou .............. 375/240.21
4,954,951 A * 9/1990 Hyatt ......................... 711/218
5,129,060 A * 7/1992 Pfeiffer et al. .............. 345/563
5,767,866 A * 6/1998 Chee et al. ................. 345/535
5,841,580 A * 11/1998 Farmwald et al. .......... 365/194
6,101,620 A * 8/2000 Ranganathan ............... 714/718

* cited by examiner

*Primary Examiner*—Kee M. Tung
*Assistant Examiner*—Hau Nguyen
(74) *Attorney, Agent, or Firm*—J. Matthew Zigmant; Townsend and Townsend and Crew LLP

(57) ABSTRACT

Methods and apparatus for changing the timing of memory requests in a graphics system. Reading data from memory in a graphics system causes ground bounce and other electrical noise. The resulting ground bounce may be undesirably synchronized with a video retrace signal sent to a display, and may therefore cause visible artifacts. Embodiments of the present invention shift requests made by one or more clients by a duration or durations that vary with time, thereby changing the timing of the data reads from memory. The requests may be shifted by a different duration for each memory request, for each frame, or multiples of requests or frames. The durations may be random, pseudo-random, or determined by another algorithm, and they may advance or delay the requests. By making the ground bounce and other noise asynchronous with the video retrace signal, these artifacts are reduced or eliminated.

27 Claims, 7 Drawing Sheets

MEMORY REQUEST TIMING RANDOMIZER

CROSS-REFERENCES TO RELATED APPLICATIONS

This application claims the benefit of U.S. provisional application 60/406,514 filed Aug. 27, 2002, titled CRTC Fetch Randomizer, by Rao et al., which is incorporated by reference.

BACKGROUND OF THE INVENTION

The present invention relates to reducing the effects of noise in a video graphics system, and more particularly to methods and apparatus for reducing the effects of noise caused by reading data from a memory in a video graphics system.

In a conventional video graphics system, data is provided by a graphics pipeline to a digital-to-analog converter (DAC), the output of which drives the input of a display monitor. Accordingly, noise at the DAC output creates video noise on the display, and degrades its performance. Thus, it is desirable to reduce noise at the DAC output.

One source of noise is ground bounce caused by the circuit switching and other voltage transients in the video graphics system. Also, these transitions often contain high frequency components that may couple to the DAC output. If more circuits switch simultaneously, the resulting ground bounce is exacerbated. Of particular concern is ground bounce caused by reading data from a graphics memory, since data having widths of 64, 128, or more bits wide may be simultaneously read from memory. As memory outputs change state during a read, capacitances on the output lines are charged or discharged. This results in large, short duration current pulses into and out of the ground supply, thereby causing the ground bounce.

If the ground bounce is random, spread in time, or has a low amplitude, the video noise generated is not necessarily apparent to an observer viewing the display. But if the ground bounce is synchronous, that is, periodic such that it occurs each time a particular pixel on the display is being updated, the resulting change in that particular pixel may become noticeable. Moreover, if many adjacent pixels are affected, such as those forming a horizontal or vertical line, an undesirable artifact may result.

Accordingly, prior art solutions have been developed to reduce ground bounce noise. For example, analog design techniques such as filtering or ground plane separations have been used. Unfortunately, these solutions require the use of costly electrical components that consume board space and often require one or more board revisions or spins.

Thus, what is needed are low cost, easily integrated methods and apparatus for reducing the effects of ground bounce and other electrical switching noise on a video signal.

SUMMARY

Accordingly, embodiments of the present invention provide methods and apparatus for changing the timing of memory requests in a graphics system, such that ground bounce and resulting video noise is asynchronous with a video stream retrace signal. Embodiments of the present invention shift requests made by one or more clients by a duration or durations that vary with time. The requests may be shifted a different duration for each memory request, for each frame, or multiples of requests or frames. The duration may be random, pseudo-random, or determined by another algorithm, and they may advance or delay the requests. By making the ground bounce and other noise asynchronous with the video retrace signal, these artifacts are reduced or eliminated.

One exemplary embodiment of the present invention provides a method of delaying memory accesses in a video graphics system. The method includes generating a first memory access request, generating a first delay, and delaying the first memory access request by the first delay. The method further includes generating a second memory access request, generating a second delay, and delaying the second memory access request by the second delay.

Another exemplary embodiment of the present invention provides a video graphics system. The system includes a graphics memory, a memory interface coupled to the graphics memory, and a scanout engine coupled to the memory interface. The scanout engine includes a FIFO, and the FIFO requests data when a low water mark is reached. The low water mark has a first value when a first request is made by the FIFO, and the low water mark has a second value when a second request is made by the FIFO.

A further exemplary embodiment of the present invention provides a video graphics system. This system includes a graphics memory, a memory interface coupled to the graphics memory, a scanout engine coupled to the memory interface and including a FIFO having a request output configured to provide a request for data when a low water mark is reached, and a delay block coupled to the request output of the FIFO. The delay block delays the request for data by a first duration before a first memory access and by a second duration before a second memory access.

Yet another exemplary embodiment of the present invention provides another video graphics system. This system includes a graphics memory, a memory interface coupled to the graphics memory, a scanout engine coupled to the memory interface and having a request output configured to provide requests for data, and a delay block coupled to the request output of the scanout engine. The delay block delays a request for data by a first duration before a first memory access and by a second duration before a second memory access.

Still a further exemplary embodiment of the present invention provides another video graphics system. This system includes a graphics memory, a memory interface coupled to the graphics memory, and a scanout engine coupled to the memory interface. Requests for data are provided by the scanout engine to the memory interface, and the memory interface delays the request before passing it to the graphics memory. The memory interface delays a request for data by a first duration before a first memory access and by a second duration before a second memory access.

Yet a further exemplary embodiment of the present invention provides another video graphics system. This video graphics system includes a graphics memory, a memory interface, a delay circuit coupled between the graphics memory and memory interface, and a scanout engine coupled to the memory interface. Requests for data are provided by the scanout engine to the memory interface, by the memory interface to the delay circuit, and by the delay circuit to the graphics memory. The delay circuit delays a request for data by a first duration before a first memory access and by a second duration before a second memory access.

Another exemplary embodiment of the present invention provides a method of delaying memory accesses in a video graphics system. The video graphics system includes a graphics memory, a memory interface coupled to the graphics memory, and a logic circuit coupled to the memory interface. The method includes generating a first number, generating a request for data with the logic circuit, and delaying the request for data by a duration proportional to the first number.

A better understanding of the nature and advantages of the present invention may be gained with reference to the following detailed description and the accompanying drawings.

DESCRIPTION OF EXEMPLARY EMBODIMENTS

Figure 1:
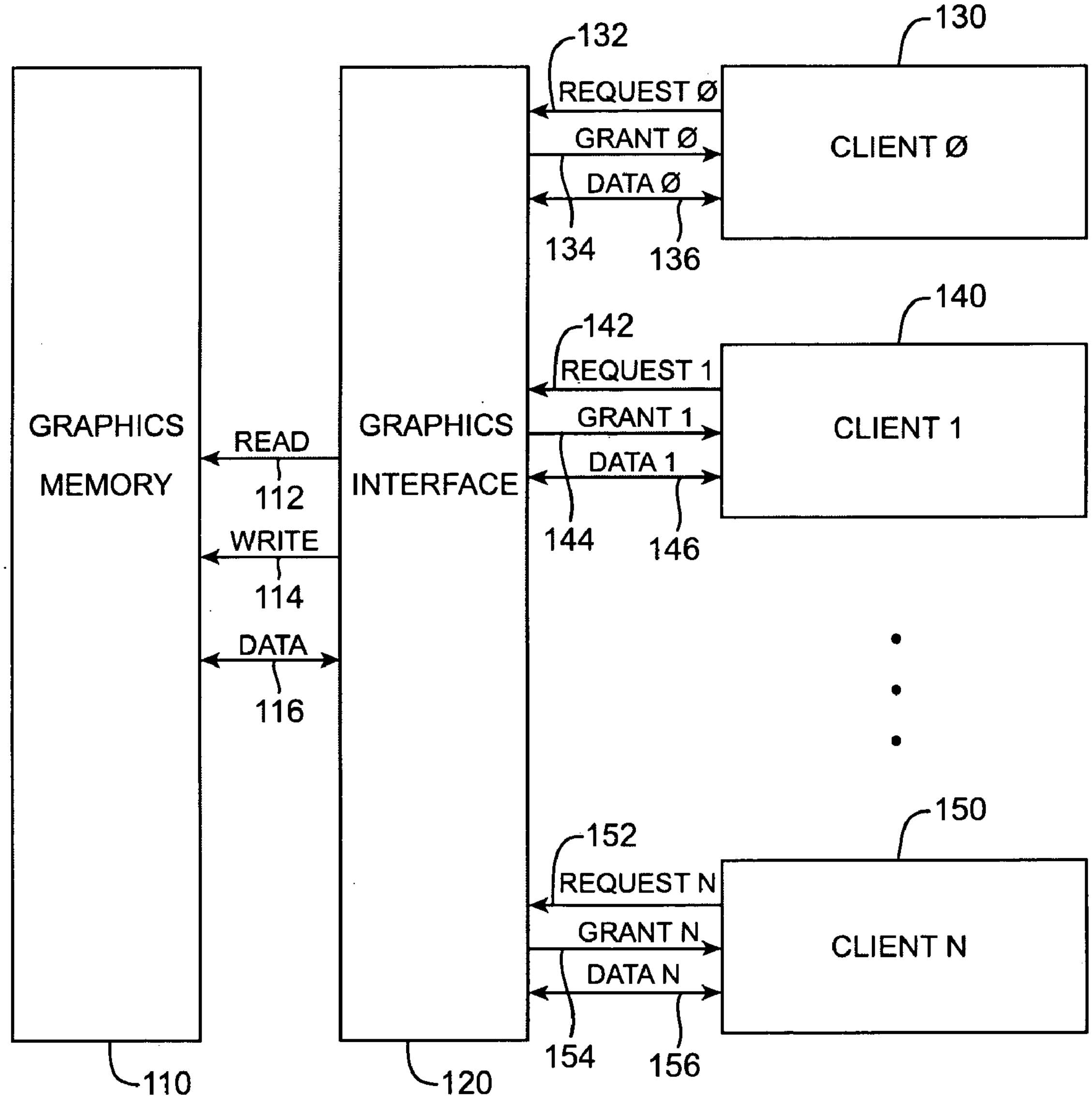
FIG. 1 is a block diagram of a portion of a graphics system that may benefit by the incorporation of embodiments of the present invention.

FIG. 1 is a block diagram of a portion of a graphics system that may benefit by the incorporation of embodiments of the present invention. This figure, as all the figures, is included for exemplary purposes only, and does not limit either the possible embodiments of the present invention or the claims.

Included are a graphics memory 110, memory interface 120, and various clients including client0 130, client1 140, and clientN 150. As indicated, there may be one or more clients. The memory interface 120 writes and reads data to and from the graphics memory 110. This data may include color, depth, texture, or other graphical information. Also, the data stored in the graphics memory 110 may include program instructions and other types of data. In this specific example, the memory interface 120 sends read and write instructions on lines 112 and 114 to the graphics memory which provides an receives data from the memory interface on lines 116. The read and write requests on lines 112 and 114 may include read and write signals, memory address locations, and other information such as instructions regarding burst or page mode reads from the graphics memory 110.

Each of these clients may be a graphics engine or other circuit. For example, these clients may include a scanout, rasterizer, shader, or other engine. Each client makes requests to read or write data from or to the graphics memory 110 to the memory interface 120. The memory interface 120 arbitrates requests from the various clients and grants the requests at appropriate times. Specifically, client0 130 makes requests to the memory interface 120 on lines 132. Lines 132 may include a request signal, one or more signals indicating whether the request is for a read or a write, as well as the addresses of locations, either physical or virtual, in the graphics memory 110. The memory interface 120 grants requests to client0 130 on line 134, and data is transferred on lines 136. Similarly, client1 140 communicates with the memory interface 120 over requests lines 140, grant lines 144, and data lines 146, while clientN 150 communicates with the memory interface 120 over request lines 152, grant lines 154, and data lines 156.

Again, ground bounce and other coupling problems are exacerbated when one client interfaces the memory on a periodic basis, particularly when it is synchronized with the scanning of the video on a display, that is, when it occurs at the same time (or times) every frame refresh or harmonic of the frame rate of the display. Of notable concern is when data is provided to a scanout engine each time the video trace being provided to a CRT monitor is at a particular location or pixel. The resulting synchronized ground bounce may cause visible artifacts on the display. This is particularly a problem when the other clients or engines in the graphics pipeline are not accessing the memory during frame refreshes.

One or more of the clients may store or buffer data received from the graphics memory in a FIFO. Accordingly, when a request by such a client for data is granted, the client's FIFO is at least partially filled. The client then uses or drains data from the FIFO. When the amount of data in the FIFO reaches a threshold referred to as a low water mark, a request for more data is made to the memory interface 120. To prevent the scanout engine from accessing the graphics memory 110 on a periodic or synchronized basis, this low water mark may be changed or varied. The amount of change may be random or pseudo-random, may follow a predetermined algorithm, or may be determined in some other way. The low water mark may be changed after one or more frames, one or more memory accesses, or at other appropriate times.

This portion of a graphics system may be included on an integrated circuit manufactured by nVidia corporation, located at 2701 San Tomas Expressway, Santa Clara, Calif. 95050.

Figure 2:
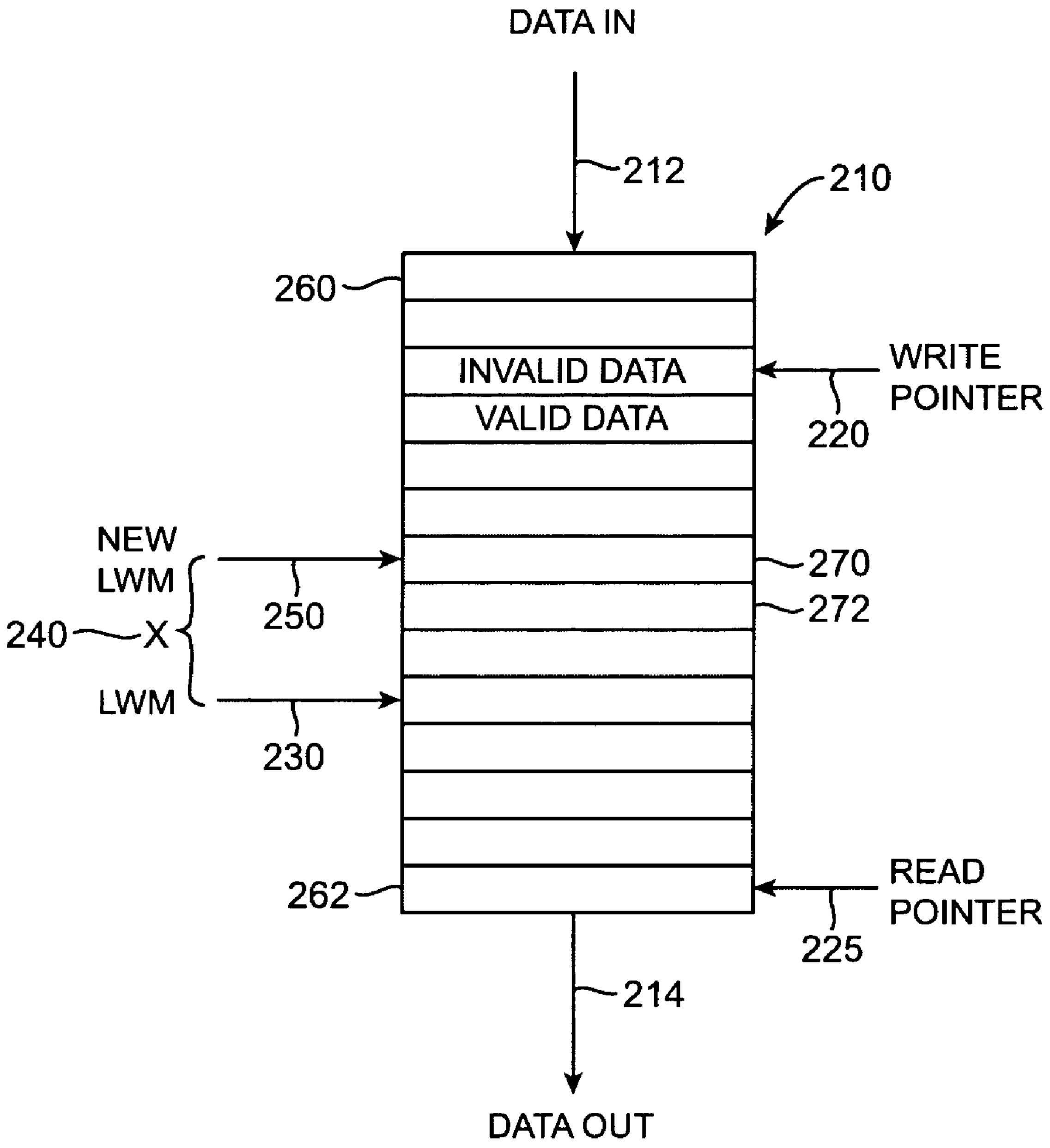
FIG. 2 is a conceptual representation of a FIFO that may form a portion of a client, such as a scanout engine, for buffering data from a memory interface.

FIG. 2 is a conceptual representation of a FIFO that may form a portion of a client, such as a scanout engine, for buffering data from the memory interface 120. Included are a memory 210 having a datain port 212, dataout port 214, a low water mark 230, write data pointer 220 and read data pointer 225. Data is input to the memory 210 on lines 212. Write data pointer 220 indicates the location where new data received on datain lines 212 should be written. Incoming data fills memory locations above the write pointer 220 in the order that is received. Data is output on the line 214, and data shifts downward each time data is output. For example, data in location 270 is shifted to location 272, and the write pointer moves down one location when data at location 262 is output on dataout lines 214.

When the write data pointer indicating the last valid data stored in the memory reaches the low water mark, a request is sent to the memory interface 120. To vary the time that a request is made, an embodiment of the present invention changes the low water mark from position 230 to position 250. These positions are separated by X 240. Again, the value of X may be random or pseudo random, or determined by some other algorithm, it may be positive or negative in value, and it may change after one or more frames, or one or more memory requests. The value of X may be generated or determined by a random number generator. Alternately, the value of the low water mark itself may be generated or determined by a random number generator.

In a practical implementation, the data is not shifted through the memory for each read. Rather, data written to a location remains at that location until it is overwritten. The write pointer indicates the location where new data received on datain line 212 should be written, and the read pointer 225 indicates the last location that data was read from (or the next location to read data from). In this implementation, the low water mark is not an absolute location, but rather a difference between the write pointer 220 and read pointer 225 locations. It will be appreciated by one skilled in the art that other specific implementations may be used consistent with embodiments of the present invention. For example, an implementation similar to the conceptual implementation above may be made using shift registers.

Figure 3:
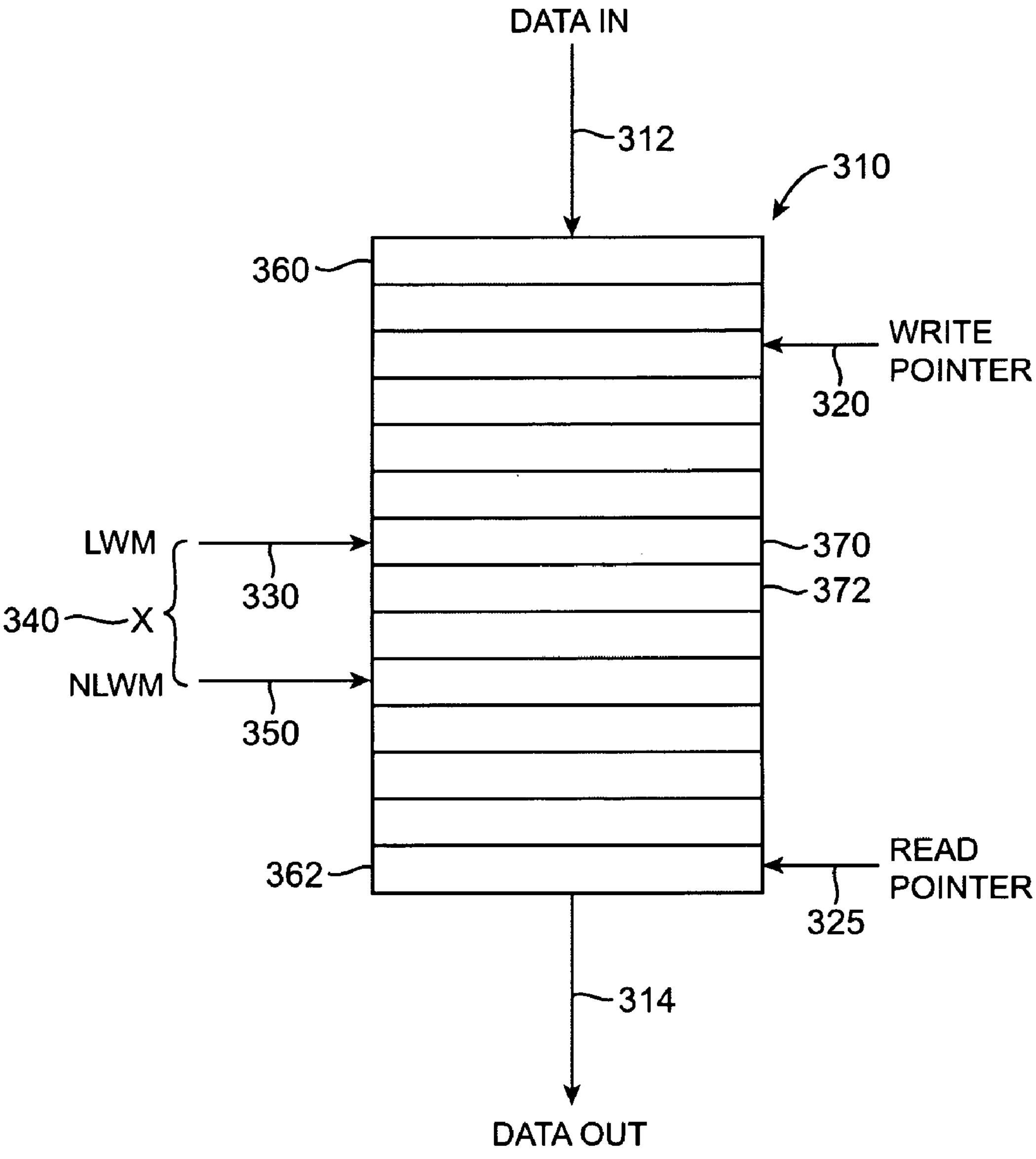
FIG. 3 is also a conceptual representation of a FIFO that may be used in a client, such as a scanout engine, for buffering data from the memory interface.

FIG. 3 is also a conceptual representation of a FIFO that may be used in a client, such as a scanout engine, for buffering data from the memory interface 120. Included are a FIFO 310 having a data input port 312, data output port 314, write data pointer 320, low water mark 330, and new low water mark 350. In this example, the new low water mark 350 has been moved below the previous low water mark 330 by an amount X 340. As before, the value of X may be random or pseudo random, or determined by some other algorithm, it may be positive or negative in value, and it may change after one or more frames, or one or more memory requests.

Figure 4:
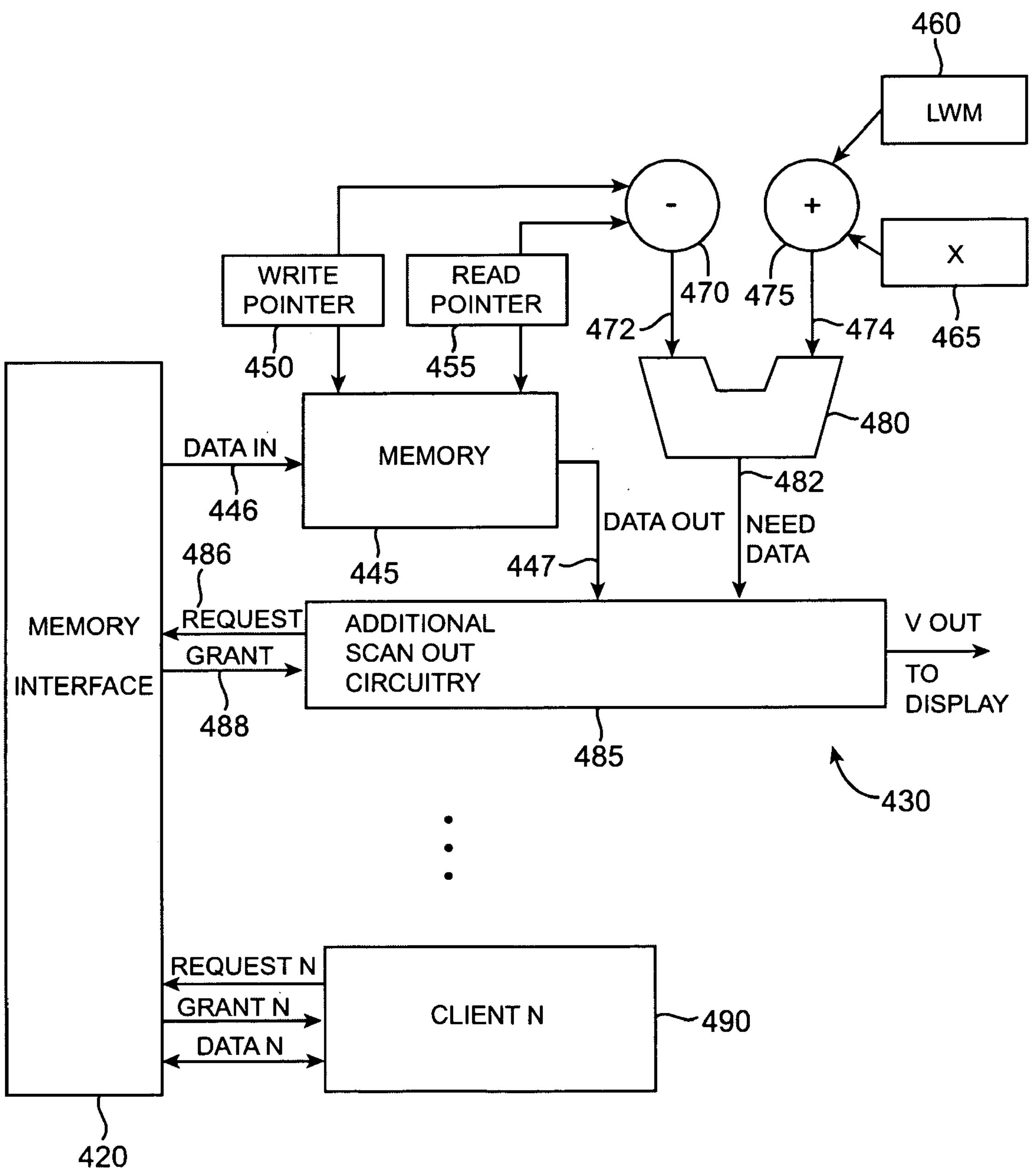
FIG. 4 is a block diagram of a circuit implementation of an embodiment of the present invention that modifies the low water mark of a FIFO such that memory accesses are order to disperse ground noise.

FIG. 4 is a block diagram of a specific circuit implementation of an embodiment of the present invention that modifies the low water mark of a FIFO such that memory accesses are varied in order to disperse ground noise. Included are a memory interface 420, scanout engine 430, and an additional clientN 490. As indicated, there may be one or more additional clients. The scanout engine 430 includes a FIFO made up of a memory 445, write pointer 450, read pointer 455, low water mark 460, number generator 465, summing nodes 470 and 475, and comparator 480. The scanout engine 430 also includes additional scanout circuitry 485. One skilled in the art will appreciate that other specific circuits may be used to incorporate embodiments of the present invention. For example, the low water mark itself may be varied or randomized in some manner, for example, it may be generated by a random number generator.

Data is received by the memory 445 on the datain line 446 and provided by the memory to the additional scanout circuitry 485 on dataout line 447. As data is read out of the memory 445, the amount of valid data in memory is diminished and the write pointer 450 and read pointer 445 approach each other in value, that is, the difference between the two is reduced. This difference is provided on line 472 to the comparator 480.

The low water mark 460 and difference amount X 465 are summed and provided on line 474 to comparator 480. The comparator 480 compares the modified low water mark with the amount of data remaining in memory 445. When the amount of valid data remaining in memory 445 falls below the modified low water mark, the comparator provides a need data signal on line 482 to the additional scanout circuitry 485. The additional scanout circuitry 485 requests data from the memory interface 420 over request line 486. At an appropriate time, the memory interface grants a request by sending a signal back on line 488. Thus, the memory 445 drains to the modified low water mark provided on lines 474, and is then at least partially refilled.

Again, in a specific situation, the scanout engine may be providing data while the other clients or engines are idling. Varying or modifying the low water mark shifts data requests to the memory interface, and thus data reads from the memory. This prevents the scanout engine from accessing the memory in a periodic or synchronous fashion that might cause ground bounce that would consistently distort one or more specific pixels during each screen retrace. Though this specific example shown is a scanout engine, embodiments of the present invention may be used in other circuits in a graphics system.

In this specific example, summing node 475 is shown as adding the low water mark 460 to the difference X 465. In other embodiments, the difference X 465 may be subtracted from the low water mark 460.

Figure 5:
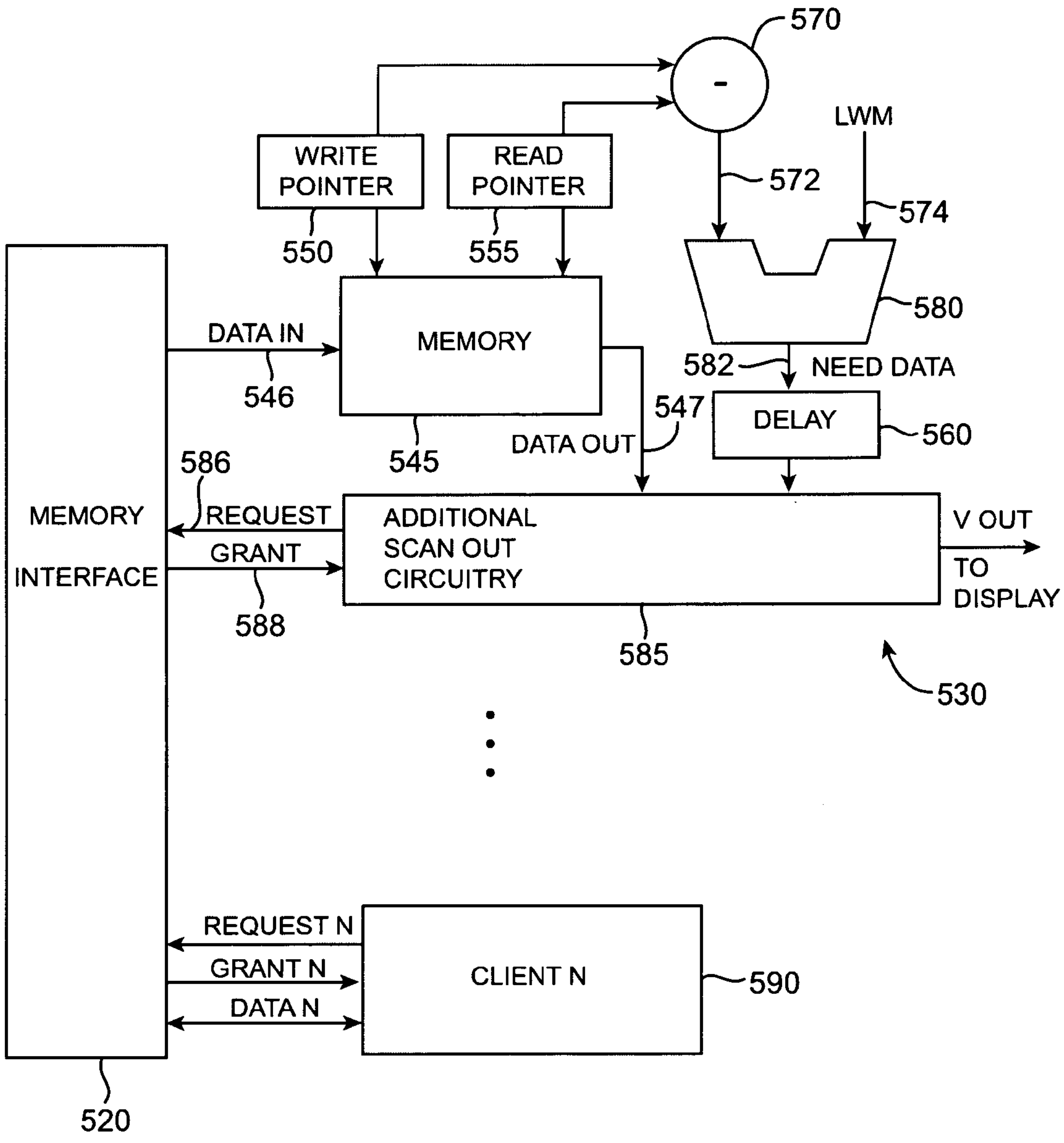
FIG. 5 is a block diagram of a circuit that may be used to change the timing of memory requests by a client.

FIG. 5 is a block diagram of a circuit that may be used to change the timing of memory requests by a client such as a scanout engine, such that ground bounce and electrical coupling problems caused by reading data from a graphics memory is at least less visible on a display monitor. Included are a memory interface 520, scanout engine 530, and clientN 590. As indicated, there may be one or more other clients. The scanout engine 530 includes a FIFO, which includes a memory 545, write pointer 550, read pointer 555, summing node 570, comparator 580, and delay 560. Also included in the scanout engine is the additional scanout circuitry block 585.

Data is received by the memory 545 on the datain lines 546 and provided by the memory to the additional scanout circuitry 585 on dataout lines 547. Again, as data is read out of the memory 445, the amount of valid data in memory is diminished and the write pointer 550 and read pointer 545 approach each other in value, that is, the difference between the two is reduced. This difference is provided on line 572 to the comparator 580.

The low water mark 560 is provided on line 574 to comparator 580. The comparator 580 compares the low water mark with the amount of data remaining in memory 545. When the amount of valid data remaining in memory 545 falls below the low water mark on line 574, the comparator provides a need data signal on line 582 to the delay block 560. This delay block delays the need data signal and provides it to the additional scanout circuitry 585.

As with all the included examples and other embodiments of the present invention, this delay may be for a number of pixel or other clock cycles, or another measuring unit may be used. The value of the delay may be random or pseudo random, or determined by some other algorithm, and it may change after one or more frames, or one or more memory requests. The duration of the delay may be determined by a random number generator. For example, a random number generator may generate a number, and the delay may be approximately that number of pixel clocks in duration.

The additional scanout circuitry 585 requests data from the memory interface 520 over request line 586. At an appropriate time, the memory interface grants a request by sending a signal back on line 588. Thus, the memory 545 drains to the modified low water mark provided on lines 574, and is then at least partially refilled.

By varying or modifying the delay time in signal path from the FIFO to the remainder of the scanout engine, data requests to the memory interface, and thus data reads from the memory, are shifted. This prevents the scanout engine from accessing the memory in a periodic or synchronized manner that might cause ground bounce that would consistently distort one or more specific pixels during each screen retrace. Again, though this specific example shown is a scanout engine, this and other embodiments of the present invention may be used in other circuits in a graphics system.

Figure 6:
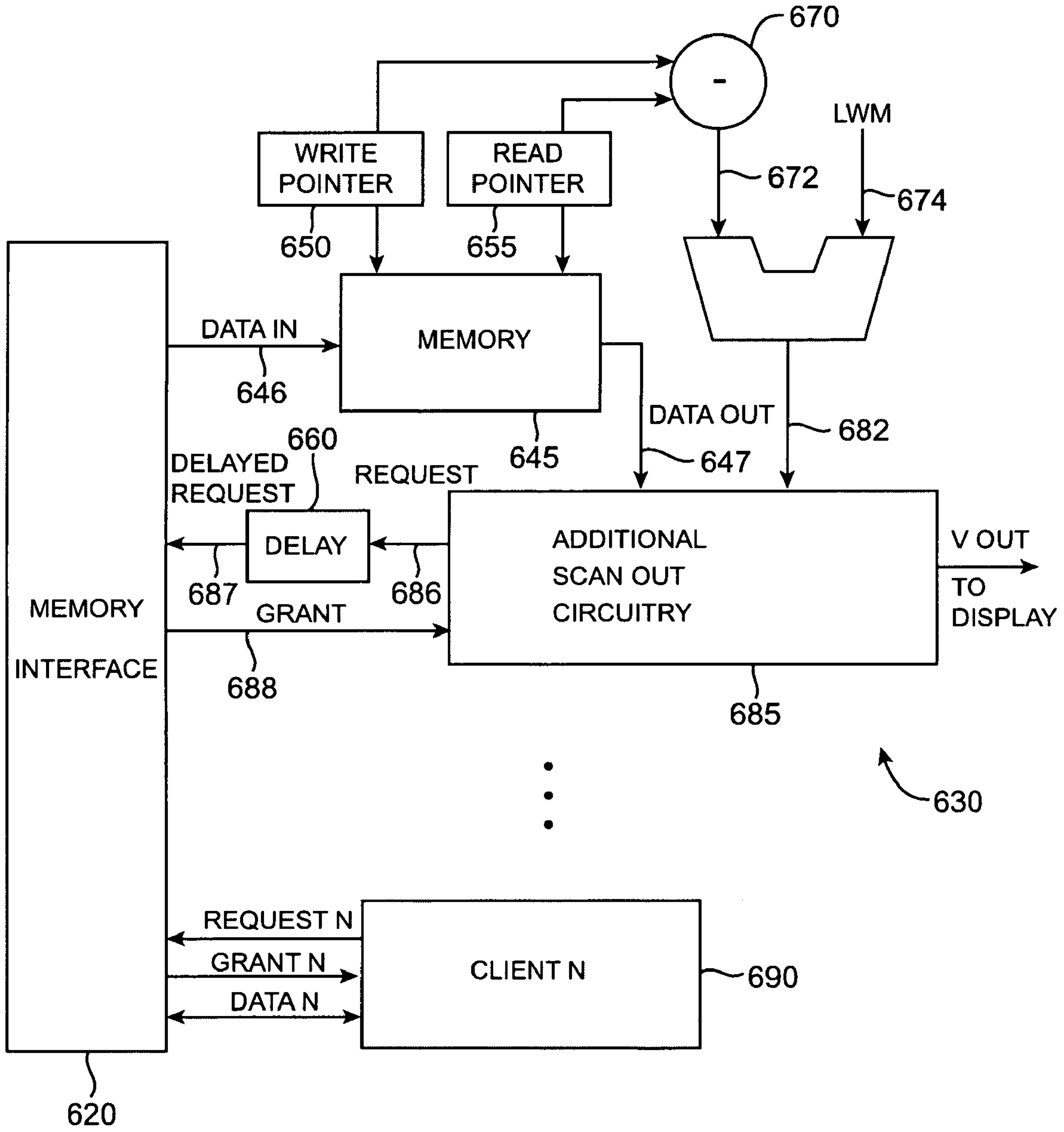
FIG. 6 is a block diagram of another specific circuit that may be used to change the timing memory requests by a client.

FIG. 6 is a block diagram of another specific circuit that may be used to change the timing of memory requests by a client such as a scanout engine, such that ground bounce and electrical coupling problems caused by reading data from a graphics memory is at least less visible on a display monitor. Included are a memory interface 620, scanout engine 630, and clientN 690. As indicated, there may be one or more other clients. The scanout engine 630 includes a FIFO, which includes a memory 645, write pointer 650, read pointer 655, summing node 670, comparator 680, and delay 660. Also included in the scanout engine is the additional scanout circuitry block 685.

Data is received by the memory 645 on the datain lines 646 and provided by the memory to the additional scanout circuitry 685 on dataout lines 647. Again, as data is read out of the memory 645, the amount of valid data in memory is diminished and the write pointer 650 and read pointer 645 approach each other in value, that is, the difference between the two is reduced. This difference is provided on line 672 to the comparator 680.

The low water mark 660 is provided on line 674 to comparator 680. The comparator 680 compares the low water mark with the amount of data remaining in memory 645. When the amount of valid data remaining in memory 645 falls below the low water mark on line 674, the comparator provides a need data signal on line 682 to the additional scanout circuitry 685.

The additional scanout circuitry 685 requests data from the memory interface 620 over request line 686. This request is delayed by the delay block 660, which provides it to the memory interface 620. As before, this delay may be for a number of pixel or other clock cycles, or another measuring unit may be used. Again, the value of the delay may be random or pseudo random, or determined by some other algorithm, and it may change after one or more frames, or one or more memory requests. At an appropriate time, the memory interface grants a request by sending a signal back on line 688. Thus, the memory 645 drains to the modified low water mark provided on lines 674, and is then at least partially refilled.

By varying or modifying the delay time in signal path from the scanout engine to the memory interface, data requests to the memory interface, and thus data reads from the memory, are shifted. This prevents the scanout engine from accessing the memory in a periodic fashion that might cause ground bounce that would consistently distort one or more specific pixels during each screen retrace. Again, though this specific example shown is a scanout engine, this and other embodiments of the present invention may be used in other circuits in a graphics system.

Figure 7:
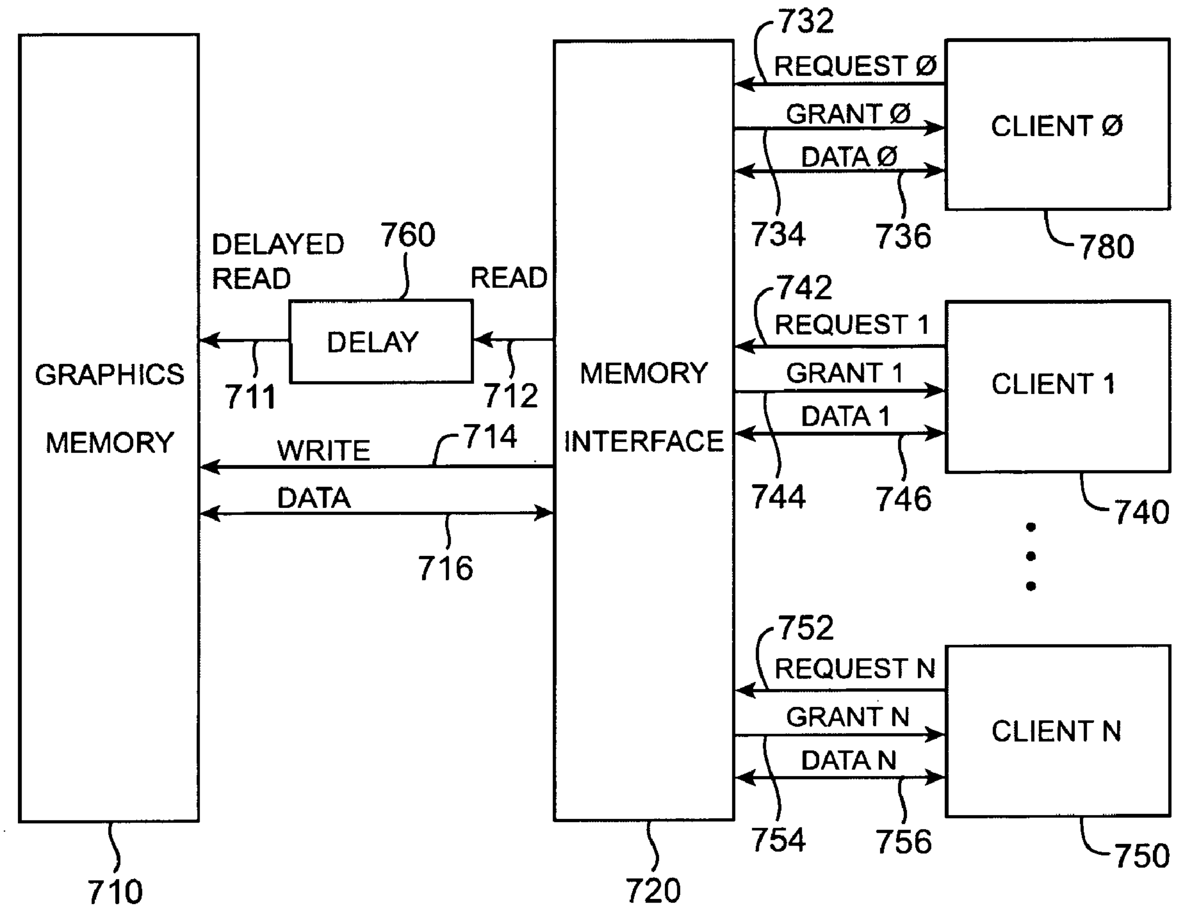
FIG. 7 is a block diagram of another specific circuit that may be used to change the timing of memory requests by a client.

FIG. 7 is a block diagram of another specific circuit that may be used to change the timing of memory requests by a client such as a scanout engine, such that ground bounce and electrical coupling problems caused by reading data from a graphics memory is at least less visible on a display monitor. Included are a graphics memory 710, memory interface 720, and various clients including client0 130, client1 140, and clientN 150. As indicated, there may be one or more other clients. The memory interface 120 writes and reads data to and from the graphics memory 110. In this specific example, the memory interface 720 sends read requests on lines 712 to the delay block 760, which delays the request before providing it to the graphics memory 710. This delay may be for a number of pixel or other clock cycles, or another measuring unit may be used. The value of the delay may be random or pseudo random, or determined by some other algorithm, and it may change after one or more frames, or one or more memory requests.

The memory interface provides write requests on lines 714 to the graphics memory 710, which provides and receives data to and from the memory interface on lines 716. The read and write requests on lines 712 and 714 may include read and write signals, memory address locations, and other information such as instructions regarding burst or page mode reads from the graphics memory 710.

By varying or modifying the delay time in read signal path from the memory interface to the graphics memory, data reads from the memory are shifted. This prevents the scanout or other engine from accessing the memory in a periodic fashion that might cause ground bounce that would consistently distort one or more specific pixels during each screen retrace.

In another embodiment of the present invention, the memory interface itself delays the read request sent on line 712, and a separate delay block 760 is not required.

The foregoing description of specific embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

What is claimed is:

1. A video graphics system comprising:
a graphics memory;
a memory interface coupled to the graphics memory; and
a scanout engine coupled to the memory interface and including a FIFO, wherein the FIFO requests data when a low water mark is reached,
wherein the low water mark has a first value when a first request is made by the FIFO, and the low water mark has a second value when a second request is made by the FIFO, the first value different from the second value, and
wherein the value of the low water mark changes at least once each frame.

2. The video graphics system of claim 1 wherein each time the FIFO makes a request, the low water mark is changed in value.

3. The video graphics system of claim 1 wherein the first value and the second value are pseudo-randomly generated.

4. The video graphics system of claim 1 wherein the first value and the second value are generated by a random number generator.

5. The video graphics system of claim 1 wherein the low water mark is changed in value for each frame in a video stream.

6. The video graphics system of claim 1 wherein the FIFO is coupled to the memory interface.

7. A video graphics system comprising:
a graphics memory;
a memory interface coupled to the graphics memory;
a scanout engine coupled to the memory interface and including a FIFO having a request output configured to provide requests for data when a low water mark is reached; and
a delay block coupled to the request output of the FIFO, wherein the delay block delays a request for data by a first duration before a first memory access and by a second duration before a second memory access, the first duration different from the second duration.

8. The video graphics system of claim 7 wherein the delay block delays each request for data by a duration, and the duration changes for each request for data.

9. The video graphics system of claim 7 wherein the first memory access and the second memory access are consecutive memory accesses.

10. The video graphics system of claim 7 wherein the first duration is a first number of pixel clock cycles, the second duration is a second number of pixel clock cycles, and the first number and the second number a pseudo-randomly generated.

11. A video graphics system comprising:

a graphics memory;

a memory interface coupled to the graphics memory;

a scanout engine coupled to the memory interface and having a request output configured to provide requests for data; and a delay block coupled to the request output of the scanout engine, wherein the delay block delays a request for data by a first duration before a first memory access and by a second duration before a second memory access, the first duration different from the second duration.

12. The video graphics system of claim 11 wherein the delay block is further coupled to the memory interface.

13. The video graphics system of claim 11 wherein the delay block delays each request for data by a duration, and the duration changes for each request for data.

14. The video graphics system of claim 11 wherein the first memory access and the second memory access are consecutive memory accesses.

15. The video graphics system of claim 11 wherein the duration of the first duration and the second duration are determined by a random number generator.

16. A video graphics system comprising:

a graphics memory;

a memory interface coupled to the graphics memory; and a scanout engine coupled to the memory interface, wherein requests for data are provided by the scanout engine to the memory interface, and the memory interface delays the request before passing it to the graphics memory, and wherein the memory interface delays a request for data by a first duration before a first memory access and by a second duration before a second memory access, the first duration different from the second duration.

17. The video graphics system of claim 16 wherein the memory interface delays each request for data by a duration, and the duration changes for each request for data.

18. The video graphics system of claim 16 wherein the first memory access and the second memory access are consecutive memory accesses.

19. The video graphics system of claim 16 wherein the duration of the first duration and the second duration are determined by a random number generator.

20. A video graphics system comprising:

a graphics memory;

a memory interface;

a delay circuit coupled between the graphics memory and memory interface; and a scanout engine coupled to the memory interface, wherein requests for data are provided by the scanout engine to the memory interface, by the memory interface to the delay circuit, and by the delay circuit to the graphics memory, and wherein the delay circuit delays a request for data by a first duration before a first memory access and by a second duration before a second memory access, the first duration different from the second duration.

21. The video graphics system of claim 20 wherein the delay circuit delays each request for data by a duration, and the duration changes for each request for data.

22. The video graphics system of claim 20 wherein the first memory access and the second memory access are consecutive memory accesses.

23. The video graphics system of claim 20 wherein the duration of the first duration and the second duration are determined by a random number generator.

24. A method of delaying a memory access in a video graphics system, the video graphics system comprising:

a graphics memory;

a memory interface coupled to the graphics memory; and a logic circuit coupled to the memory interface, the method comprising:

generating a first number;

generating a request for data with the logic circuit; and delaying the request for data by a duration proportional to the first number, wherein a new first number is generated each frame.

25. The method of claim 24 wherein the delayed request for data is provided to the memory interface.

26. The method of claim 24 wherein the logic circuit is a scanout engine.

27. The method of claim 26 wherein each request for data is delayed by a duration proportional to a number, and the number is a pseudo-random number.

* * * * *